United States Patent [19]

Burbank, III

[11] Patent Number: 4,540,257
[45] Date of Patent: Sep. 10, 1985

[54] CARD SEPARATING MEMBERS FOR A MICROFICHE STORAGE AND RETRIEVAL SYSTEM

[75] Inventor: John E. Burbank, III, Ridgefield, Conn.

[73] Assignee: Minnesota Mining and Manufacturing Company, St. Paul, Minn.

[21] Appl. No.: 591,053

[22] Filed: Mar. 19, 1984

Related U.S. Application Data

[63] Continuation-in-part of Ser. No. 474,570, Mar. 11, 1983, Pat. No. 4,487,487.

[51] Int. Cl.³ .............................................. G03B 23/08
[52] U.S. Cl. .................................. 353/103; 353/27 R; 353/117
[58] Field of Search ................... 353/103, 27 R, 27 A, 353/117, 118, 25; 209/569, 583

[56] References Cited

U.S. PATENT DOCUMENTS 3,055,522 9/1962 Cronquist .
3,429,436 2/1969 Irasek .
3,604,850 9/1971 Echenbrocht et al. .
3,753,240 8/1973 Merwin .
3,800,942 4/1974 Hirata .
4,190,899 2/1980 Smith et al. .
4,273,427 6/1981 Bailey .

Primary Examiner—Harry N. Haroian
Attorney, Agent, or Firm—Donald M. Sell; James A. Smith; John C. Barnes

[57] ABSTRACT

A microfiche card storage and retrieval system comprising a carousel for storing a plurality of microfiche cards, means for separating microfiche cards adjacent a preselected card in said carousel such that a preselected card may be grasped and moved from said carousel and reinserted. The spreading means comprising fingers that move toward the center and inwardly in relationship to the trays to contact and separate neighboring microfiche cards from a preselected card.

12 Claims, 7 Drawing Figures

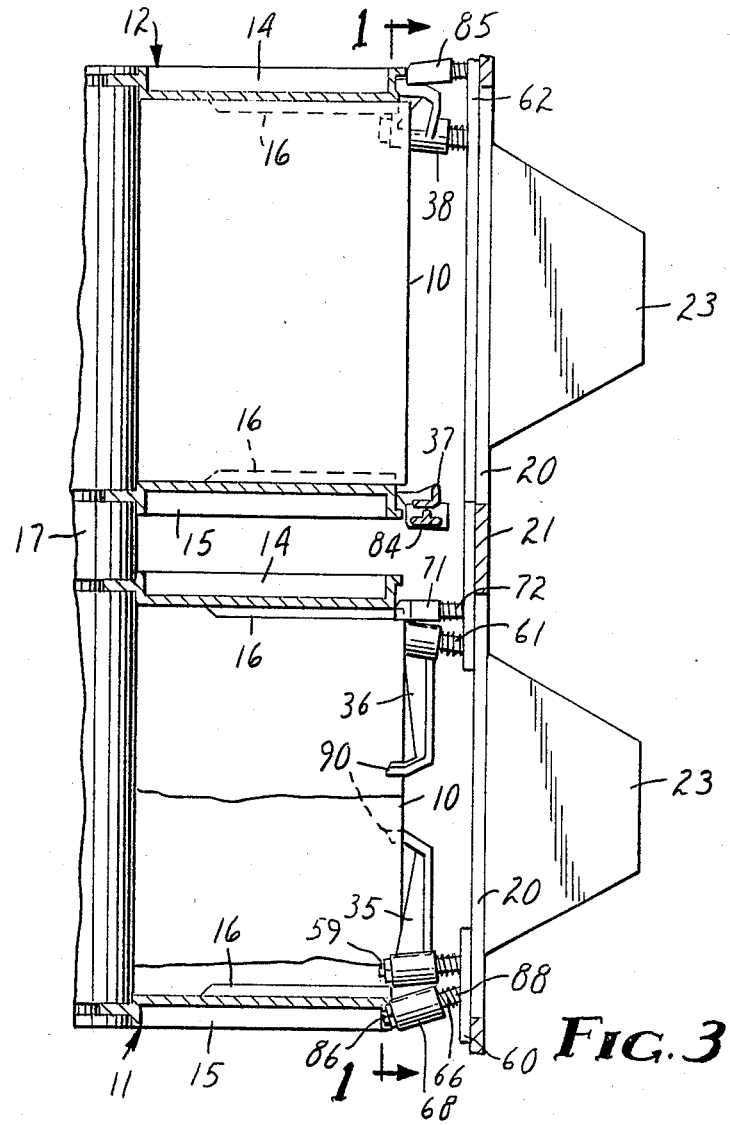
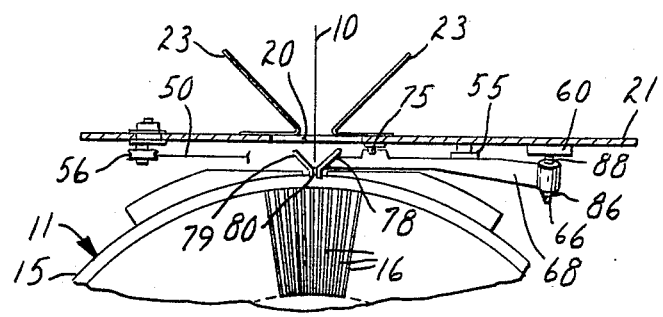

CARD SEPARATING MEMBERS FOR A MICROFICHE STORAGE AND RETRIEVAL SYSTEM

This application is a continuation-in-part of application Ser. No. 474,570, filed Mar. 11, 1983, now U.S. Pat. No. 4,487,487.

BACKGROUND OF THE INVENTION

1. Field of the Invention

This invention relates to an apparatus for storing and retrieving microfiche cards and one aspect of the invention is a device for separating cards stored in closely adjacent position in a tray to afford access to a predetermined card.

2. Description of the Prior Art

Storing a plurality of microfiche and retrieving a single microfiche to display individual images and project the same either on a screen, make a hard copy of the image, or position the microfiche such that a video signal may be generated by scanning the film for projection on a remote terminal is being practiced by commercial equipment. Examples of patents disclosing a microfiche retrieval system of the type addressed herein are U.S. Pat. Nos. 3,429,436, issued Feb. 25, 1969 to E. H. Irasek; 4,190,899, issued Feb. 26, 1980 to D. H. Smith et al; and 4,273,427, issued June 16, 1981 to D. C. Bailey. Numerous additional patents exist relating to devices for scanning microfiche or other microfilm image-supporting media such that the information on the microfilm image may be retrieved and reread by a projection image or by duplication on a CRT terminal. Examples of such devices are illustrated in U.S. Pat. Nos. 3,753,240, issued Aug. 14, 1973 to Roy L. Merwin; and 3,604,850, issued Sept. 14, 1971 to R. R. Eckenbrecht et al.

These systems provide a means for storing information which must be stored on a photographic medium and retrievable automatically by suitable coding logic stored in a computer. The actual storage and retrieval device will respond to the signals to rotate the storage file to locate the predetermined microfiche card at the retrieval opening such that it may be removed from the file and a specific image on the card positioned for reading the image either by projection, by scanning, or by copying.

The present invention thus deals with the file for storing the microfiche cards. The apparatus for separating the cards in the file to allow a selected card to be drawn from the file and positioned at the film reading station varies with different apparatus but is very important to permit a selected card to be withdrawn and reinserted in the file.

The mechanism utilized for storing the microfiche card comprises a tray, fixed on a rotatable axis and positionable to place a given one of the storage slots at the access opening. Picker fingers then grasp the microfiche card, lift the card slightly off the tray, straighten (by tensioning) the leading edge of the card and withdraw it from the file. Separators separate and hold the adjacent cards from the selected card so that card can be readily grasped, so there is no tendency for the adjacent cards to drift outward along with the selected card, and to permit the return of the selected card without collision. The removed card is positioned at the viewing station. Thus, the visual patterns stored in the microfiche card can be optically scanned to convert the image pattern electrically to signals which by analog-to-digital conversion and speed conversion are transmitted to remote terminals along with alphanumeric data for review by an operator. The equipment of this invention will make visual patterns stored on-line in a control system totally computer driven and accessible. When the information has been viewed the microfiche card is reinserted into the slot in the tray and the separators for the adjacent microfiche cards are returned to their normal position and the tray carousel is rapidly indexed to locate the next microfiche card called for by the computer.

During insertion of the microfiche cards, which are four to eight mils in thickness and quite susceptible to bending or buckling during mechanical handling of the microfiche cards, the cards may become damaged or destroyed. It is therefore important the equipment handle the cards in a manner to guide the card into the tray as much as possible when the card is reinserted and to hold adjacent cards so they do not have the ability to drift outward when a selected card is being withdrawn.

The prior art has utilized numerous devices for precisely positioning a microfiche card in a storage tray to permit the card to be retrieved from the tray and returned to the tray. U.S. Pat. No. 3,429,436 discloses a microfiche card storage and retrieval device wherein each of the microfiche cards are provided with an edge strip to hold an edge of the card in a rigid position within the storage device. When a predetermined card is selected the selected card will be stopped adjacent the center of a delivery station. The adjacent cards are separated by a pair of wedges. The wedges move under the urging of rotatable cam plates which move the wedges away from the carousel and toward each other. Then the wedges numbered 147 move inwardly past the edges of the cards on either side of the selected card and as the plates continue to rotate, the wedges are moved apart to move all of the cards away from the selected card and against the bias of two springs 150A away from rigidly mounted opposed plates 150B in the drum which serves to support the cards. The separation of the neighboring cards from the preselected card thus permits withdrawal and reinsertion of the card. The effect is to be continually moving all the cards relative to the trays each time the selected card is to be withdrawn.

The present invention provides a card storage system utilizing a pair of circular trays each formed with verically spaced opposed grooves for receiving opposite edges of a microfiche card. A card is located by the position of that card in the drum. Rotation of the drum a predetermined number of steps positions a card precisely at the retreval station. At the retrieval station the card can then be retrieved without interferring with the other cards except the cards adjacent the selected card are bowed at the center portions thereof to separate them from the selected card.

The present invention thus solves the problem of having all of the cards being moved transversely of their position in the tray as selected cards are retrieved. It further does not require that a storage tray be filled to any predetermined amount before the system can be utilized to store and retrieve microfiche cards. It affords storage of cards made of thin film material, and it affords reliable retrieval of cards of thin material which do not have a support strip on any edge.

SUMMARY OF THE INVENTION

The present invention is an improvement in microfiche storage and retrieval systems and comprises a pair of spreading fingers which can be utilized to separate the neighboring cards to a preselected card such that the selected card can be withdrawn from the storage tray. The present invention is directed to a card storage device comprising a pair of fingers which are each mounted for movement from an edge of the storage tray toward a position generally centrally between the flanges of the tray, which tray is formed with opposing slots positioning the microfiche card. Aiming arms are positioned adjacent the edge of the storage trays at the retrieval station. The spreading fingers are mounted in the normal position on opposite sides of the card slots and one adjacent each tray flange and are movable to a position generally centrally between the flanges of the card supporting tray and means are provided for moving said fingers along a path from said aiming arms toward said center portion of said tray. The fingers are formed to move between the adjacent microfiche cards and they contact the cards adjacent the selected card and force a bow to form in the adjacent cards concave to the selected card to clear the slot for the selected card such that the same may be removed and returned. Means are provided on the fingers to urge the aiming arms to a preset position adjacent the selected slot in the tray's flanges.

In a microfiche storage and retrieval system utilizing a pair of axially aligned storage trays for microfiche cards a pair of fingers may be utilized with each tray wherein one pair is positioned adjacent the upper tray and they are movable to a position between the flanges of the upper tray and a second pair is positioned adjacent the lower tray of the carousel and movable toward a position generally centrally between the flanges of the lower tray. Actuator means comprising a single reversible motor a drive member driven a predetermined amount in each direction operates a cable means which affords movement of the pairs of fingers. The aiming arms and spreading fingers are adjustably positioned and spring biased to restrict any damage and to move toward and away from the trays to restrict cards from drifting out when a selected card is removed and clear the path of the cards to permit the trays to rotate.

BRIEF DESCRIPTION OF THE DRAWINGS

The present invention will be described with reference to the accompanying drawing wherein:

FIG. 3 is a fragmentary vertical transverse sectional view through the circular trays of the carousel supporting the microfiche cards and showing the spreading fingers in a side view;

FIG. 4 is a fragmentary sectional view taken along line 4—4 of FIG. 2 showing the lower flange of a tray and a plan view of the aiming arm;

DESCRIPTION OF THE PREFERRED EMBODIMENTS

Figure 1:
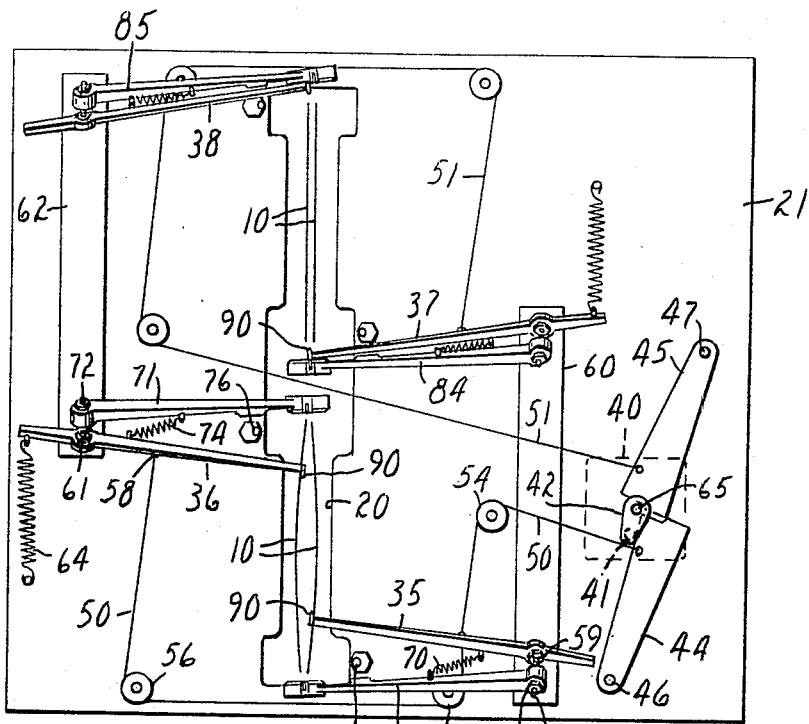
FIG. 1 is a vertical sectional view taken along the lines 1—1 of FIG. 3.

The present invention is directed at an improvement in a microfiche card storage and retrieval assembly which permits visible patterns stored in the microfiche card to be retrieved on-line at the direction of a computer and through optical to electrical conversion, analog-to-digital conversion and speed conversion to be transmitted to a remote terminal along with alphanumeric data from the computer or additional storage memories.

The device of the present invention comprises a carousel assembly in which a plurality of microfiche can be stored in the two trays of the carousel assembly allowing picker fingers which transport the cards in and out of the carousel to receive or extract a card from either tray. For the microfiche card transport apparatus to grasp and transport the cards the cards are positioned adjacent an access or card retrieval opening where they are extracted from the storage carousel by the fingers which extend through the opening to grasp the card. Prior to such access the card is positioned by the carousel. The spreading members are moving the adjacent cards out of engagement with the selected card and the selected card is isolated for contact with the picker fingers. The fingers remove the card and the spreading fingers move to the card separating position and the card aiming arms are moved into position by the trays to aid in reinserting the card. The spreading fingers and arms then return to the rest or index position. These novel aspects of the present system will be described in greater detail.

The system of the present invention is adapted for use in a microfiche card storage and retrieval system as described and in the parent application Ser. No. 474,570 filed Mar. 11, 1983 and in application Ser. No. 474,538 filed Mar. 11, 1983, both of which are incorporated herein by reference.

Referring now to the drawing, the microfiche cards 10 are supported in a carousel comprising a pair of circular trays 11 and 12, each provided with a pair of axially spaced horizontally positioned upper flanges 14 and lower flanges 15 (see FIG. 3) which are each formed with axially aligned and oppositely opening grooves 16 for receiving a plurality of microfiche cards 10 mounted for simultaneous rotation with a hub 17. Thus the plane of each of the cards is oriented parallel to the axis of the carousel. In order to position the carousel such that a preselected microfiche card 10 can be disposed at a retrieval station defined by an opening 20 in an adjacent support wall 21, the carousel is driven by a stepping motor, not shown, which drives the carousel with exact precision to position one of the many slots in each tray to a predetermined aligned position with a slot 16 between flanges 14 and 15 at the access or retrieval opening 20.

On the side of the wall 21 opposite the carousels 11 and 12 are guide plates 23 which aid to guide a card 10 through the opening 20 and into a tray of the carousel.

Figure 2:
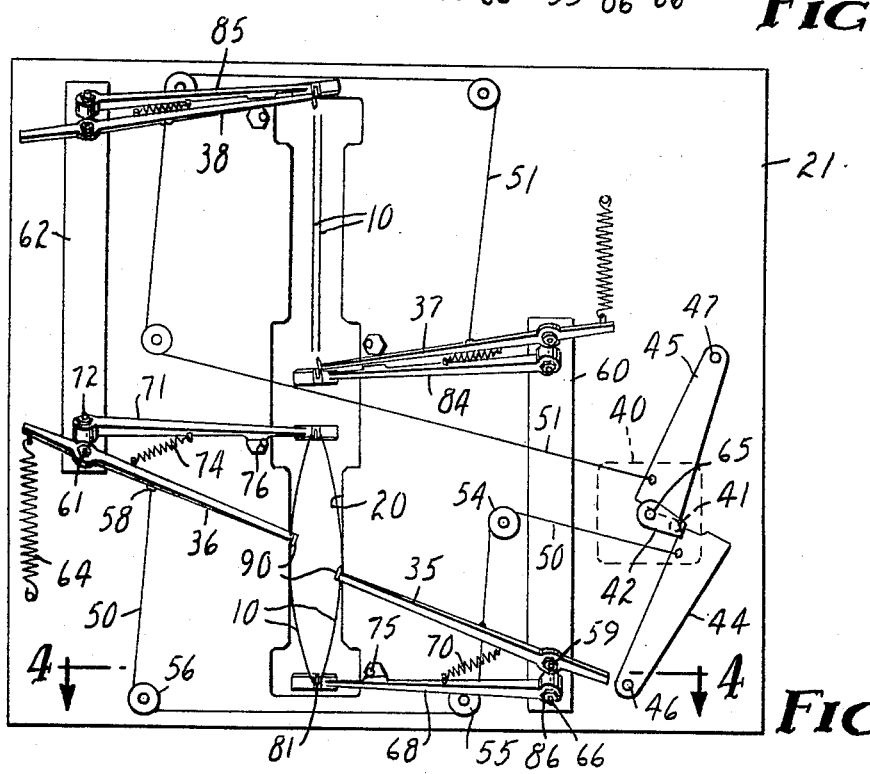
FIG. 2 is a vertical sectional view corresonding to FIG. 1 showing one card spreading mechanism moved to an alternate position.

The vertical wall 21 separates the carousel storage area of the device and the card-handling and transport mechanism which serves to pick the selected card from either tray of the carousel, withdraw it and position it and selected images thereon at a reading or view station. FIGS. 1 and 2 illustrate the card separation mechanism as viewed from the trays to illustrate the construction and operation of the mechanism. The card separation mechanism will engage the cards adjacent a selected card positioned at the opening 20 and separate the same to keep them from getting in the path of the card which is being extracted or returned. This is accomplished by spreader fingers which deflect the leading edges of the adjacent cards. This is very helpful because of the compact nature of the trays and the closely positioned cards can become bent and bowed, from standing on their edges, particularly when the cards are formed of relatively thin, i.e, 0.10 mm (4 mil) film.

FIG. 1 illustrates the position of the mechanism just prior to the picker fingers of the transport mechanism moving through the opening 20 to pick a card from the lower tray of the carousel. The spreading fingers for the upper tray are illustrated in the rest or carousel index position.

The operation of the spreading fingers identified by the reference numerals 35, 36, 37 and 38 are actuated by a stepping motor 40 which drives an eccentric pin 41, and a radial arm 42, from a central or zero position (not shown) either clockwise or counterclockwise (as illustrated) to actuate or pivot one or the other of two levers 44 and 45. The levers 44 and 45 are pivotally mounted on pins 46 and 47 respectively, and one end of a cable 50 is connected to lever 44 intermediate its ends and one end of a cable 51 is connected similarly to lever 45. The cable 50 is directed around a pulley 54 and is then connected to the spreading finger 35 and then is directed around the pulley 55 and over to the pulley 56, and is anchored at its opposite end to spreading finger 36. The anchor of the cable 50 to the finger 36 is made at the position 58 intermediate the ends of the finger. The picker finger 35 is supported and rotatable on a pin 59 which is supported from a plate 60 which plate is adjustably mounted on the wall 21. The finger 36 is pivotally mounted intermediate its ends on a pin 61 which is supported on a plate 62 adjustably mounted on the wall 21. Pins 59 and 61 are the pivot axes for the spreading fingers and are disposed at an angle to the tray flanges and at an angle of about 85° to the plane of wall 21. A spring 64 is connected between an end of the finger 36 and the wall 21 to place tension in the cable 50 which holds the lever 44 in contact with the drive cam driven by the motor 40 including the shaft 65 carrying the radial arm 42 and the eccentric actuating pin 41. Also supported on the plate 60 by a pin 66 is an aiming arm 68 which is joined by a spring 70 to the spreading finger 35. An aiming arm 71 is similarly pivoted on a pin 72 and connected to the finger 36 by a spring 74. The springs 70 and 74 urge the aiming arms 68 and 71 against adjustable stops 75 and 76 respectively, to position the free ends of the aiming devices in precise fixed positions adjacent the lower flange 15 and the upper flange 14 of the tray respectively. The arm 68 is illustrated in plan view in FIG. 4 and is formed at one end with a pair of diverging guide surfaces 78 and 79 which direct a card into a very narrow slot 80 defined therebetween which has a base surface 81 and which is positioned precisely at the radial location and elevation of slot 16 in the lower flange 15 of the lower tray 11.

The same precise positioning is true of the aiming arm 71 when it is urged by spring 74 into engagement with the stop 76.

In reviewing the operation of the card separating system it is noted in FIG. 1 that a card is to be selected from the lower tray, and the motor 40 has driven the arm 42 in a counterclockwise direction such that pin 41 has contacted the lever 44, causing it to pivot about the axis 46 and place tension in the cable 50. As it is moved from the zero point to the point shown in FIG. 1 or through an angle of approximately 60 degrees, the spreading fingers 35 and 36 have moved from their rest position upwardly and inwardly toward the central portion of the tray 11 against the bias of the spring 64. Tension has not yet been placed in the spring 70 or 74, and the aiming arms are still at the rest position. The picker fingers of the card handling and transport mechanism may now come through the opening 20 defining the card retrieval station and grasp the card which would be positioned between the cards 10, illustrated in FIG. 1. In moving to this position the arms have moved the cards such that the fingers may pick the predetermined card to be removed from the carousel and the fingers 35 and 36 have also moved from a position beyond the periphery of the tray toward the tray at a shallow angle to engage the ends of the cards 10 to restrict them from drifting out of the tray as the picker fingers extract the chosen card. The motor 40 then continues to drive the radial arm 42 in a counterclockwise position toward that shown in FIG. 2, and the spreading fingers have moved closer together and further toward the center position between the flanges of the lower tray 11. The cable 50 has also tensioned the spring 70 and spring 74 causing the aiming arms 68 and 71 to be moved toward the respective stops 75 and 76 whereupon they are in position for aiming a card 10 back into the carousel.

The aiming arm 68, 71, and aiming devices 84 and 85 are also mounted on pivot axes which are positioned at an angle with respect to the plane of the tray flanges and at an angle of about 75° from the wall 21 to cause the aiming devices to move from their rest position to their activated position which is closer to the carousel and thereby close the gap which would otherwise exist between the aiming arm and the slot 16 in the carousel. FIG. 4 illustrates the funnel-like end of the aiming arm 68 positioned against the carousel to aim the incoming card 10 into a vacant slot 16 in the carousel. An adjusting nut 86 on the end of the pin 66 (with similar nuts on the ends of the pins for the aiming arms 71, 84, and 85) is used to adjust the arm in its activated position to minimize the gap between the aiming arm and the carousel flange. A spring 88 positioned between the adjustable plate 60 and the arm 68 takes up any backlash in the adjustment. In the initial actuation of the spreading fingers the aiming arms 68 and 71 do not move due to the fact that the springs 88 provide sufficient friction between the arm 68 and the fixed adjusting nut 86 or a washer positioned between the knuckle of the arm 68 and the nut 86 to hold the arms in place.

When a card is being inserted into the carousel the aiming arms of the appropriate tray are there waiting for it and guide the card into the tray. As soon as the card enters the slots of the tray the spreader arms are rotated back to their rest position by the motor 40 moving the pin 41 clockwise back to the zero position. On their way back the spreading fingers 35 and 36 will engage the aiming arms and carry them back also to their rest position. The spreading fingers are returned by the force of the spring 54 which serves as a return spring. The spring 64 returns the spreading fingers 35 and 36 to their rest positions and maintains the lever 44 in contact with the cam means, or the pin 41, and the shaft 65, to return the lever 44 to its rest position as well.

The carousel is always stopped when the spreading fingers are being activated to separate cards in the tray, thus, the angle tips 90 of the spreading fingers 35, 36, 37 and 38 are out of the path of the cards 10 before there is movement of the carousel.

The adjustable plates 60 and 62 permit precise adjustment of the location of the pivot axis of the picker fingers and the aiming means, and each plate supports an aiming arm and a picker finger from each set for each tray in the carousel.

Figure 5:
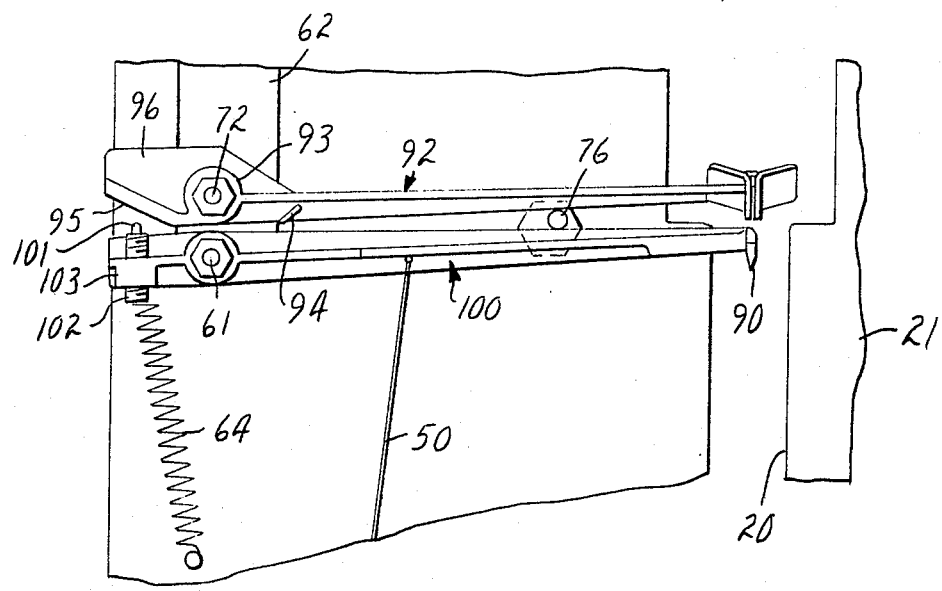
FIG. 5 is a detail elevational view of an alternative form of the spreading finger and aiming arm.
Figure 6:
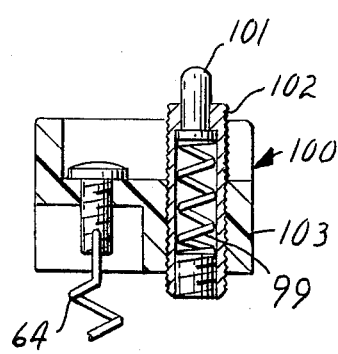
FIG. 6 is a detail sectional view of the end of the spreading finger of FIG. 5.
Figure 7:
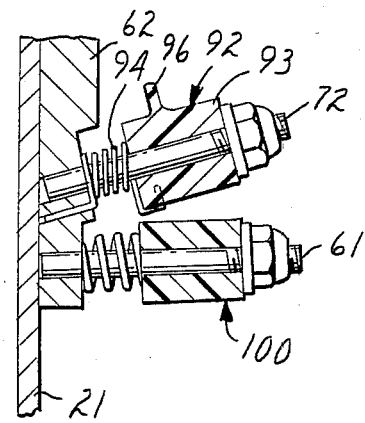
FIG. 7 is a fragmentary detail sectional view of the support for the spreading finger and aiming arm of FIG. 5.

An alternative structure for the return of the aiming arms is illustrated in FIGS. 5, 6 and 7. A single arm and finger are illustrated, which would be substituted for arm 71 and finger 36. In this embodiment each of the aiming arms would be formed like arm 92 and formed with a hub 93 which receives a pin 72 but a torsion spring 94 has been substituted for the compression spring, similar to spring 88. The spring 94 will urge the aiming arm 92 counterclockwise, as illustrated in FIG. 5, to a rest position. Also, each aiming arm 92 has a flange 95 which is rigidly supported by a unitary gusset 96 formed about the hub 93.

Each cooperating spreading finger 100 has a spring 99 urged plunger 101 which is positioned to engage the flange 95. This plunger 101 replaces tension spring spring 74. The plunger 101 is slidably supported in an externally threaded sleeve 102 which is held in a bulwark 103 molded with the finger 100 to engage the flange 95 upon rotation of the finger 100 by tension on cable 50. Plunger 101 causes the aiming arm 92 to be urged against the bias of torsion spring 94. When the aiming arm reaches the stop 76 the plunger can be depressed against the spring 99 until the spreading finger 100 reaches its central card spreading position.

When the members are to be returned to normal position the motor 40 moves the pin 41 clockwise and the spreading finger 100 will rotate counterclockwise under the force of spring 64. Aiming arm 92 however can return under the force of the torsion spring 94 and would not rely on the spreading finger 100 to be returned and then engage the aiming arm to move it from the stop 76.

The return movement of arm 92 is more rapid in this embodiment to move the aiming arm out of the path of the card. In other respects the operation of the card handling device corresponds to that hereinabove described.

Having thus described a preferred embodiment of the present invention with reference to the accompanying drawing it will be understood that changes may be made without departing from the invention as described in the appended claims.

I claim:

1. In a microfiche card storage and retrieval device having a tray for storing a plurality of microfiche cards with edges of the cards disposed in generally parallel alignment in selective slots formed in opposed flanges defining said tray, the improvement comprising
   a pair of fingers disposed adjacent the flanges,
   means for moving said fingers from a rest position adjacent an edge of a said slot near said flanges toward a position generally centrally of the flanges of said tray, said means for moving said fingers comprising means for moving said fingers on a path from said rest position toward said center position and spaced from each other and from the edge of said slot, and means for returning said fingers to said rest position such that when said fingers are in said position adjacent the center of the tray the cards adjacent a preselected one of said slots in said tray will have the centers bowed away from the preselected slot for supporting a selected card.

2. A microfiche card storage and retrieval device according to claim 1 wherein an aiming arm is disposed adjacent the periphery of said tray and said aiming arm is moved to a position aligned with a selected slot when said fingers are moved to said center position to engage microfiche cards in said tray and said aiming arm is moved by spring means carried by said fingers against stop means for positioning said aiming arm at a said selected slot.

3. A microfiche card storage and retrieval device according to claim 1 wherein said fingers are pivotally supported on axes which are disposed at an angular relationship to the plane of a said tray and said fingers are connected to a cable and said cable is movable such that said fingers pivot on said axes to move toward each other toward the center of the tray and inward of said tray as the fingers are moved from said rest position, and biasing means are connected to a said fingers to return said fingers and said cable.

4. In a card storage and retrieval device having a storage tray with a pair of opposed flanges with opposed axially aligned slots for storing a plurality of cards with edges of the cards disposed in generally parallel alignment and means defining a card retrieval station for removing or inserting a card in a preselected pair of said opposed slots, the improvement comprising
   a pair of fingers disposed one adjacent each of said flanges and positioning means for positioning said fingers in a rest position adjacent the flange of said pair of trays,
   means for moving said fingers from said rest position toward a position generally centrally of the flanges of said trays, said means for moving said fingers comprising means for moving said fingers along a path diverging from the plane of a said preselected pair of slots toward said center position, and means for returning said fingers to said rest position adjacent said flanges such that when said fingers are in said position adjacent the center of the flanges the cards adjacent the preselected one of said slots in said trays will have the centers bowed away from the preselected slot for supporting a selected card.

5. A card storage and retrieval device according to claim 4 wherein said positioning means is a cam means disposed adjacent the periphery of an actuating lever for tensioning a cable connected to said fingers for pivoting said fingers in opposite directions to move toward said central position.

6. A card storage and retrieval device according to claim 4 wherein said fingers are supported on axes and are connected to a cable and said cable is movable in a path such that said fingers pivot toward said central position and each other as the fingers are pivoted and they move about an arcuate path at the center of said tray to separate cards on each side of the selected card, and spring means return said fingers to the rest position.

7. A card storage and retrieval device according to claim 6 wherein said axes are disposed at an angle to the plane of said trays whereby said fingers as they are moved from said rest position move toward said tray.

8. A card storage and retrieval device according to claim 4 wherein said spreading fingers are disposed one adjacent each flange of said tray and each finger is pivotally mounted on an axis disposed in spaced relationship to said retrieval station,
    said positioning means comprises
        cam means for driving said fingers,
        lever means engageable with said cam means,
        spring means for maintaining said lever means in engagement with said cam means, and
        cable means connected to said lever means and to said finger for pivoting each said finger about the said axis.

9. A card storage and retrieval device according to claim 8 wherein said
    cam means comprises an eccentric pin mounted on a radial arm driven by a shaft.

10. A card storage and retrieval device according to claim 8 including an aiming arm means pivotally mounted on an axis and positioned adjacent said spreading fingers,
    spring means carried by said fingers to bias said arm means toward a said flange when said finger is moved toward said central position, and
    stop means for stopping said aiming means in alignment with a selected slot when said spreading fingers are at said central position for guiding a said card back to said selected slot.

11. A card storage and retrieval device according to claim 8 wherein said axes are mounted at an angle to the plane of said flanges to move said fingers toward said tray as they move toward said central position.

12. A card storage and retrieval device according to claim 10 wherein each said axis for supporting said fingers and said aiming arm means are disposed at an angle to the plane of said trays for swinging said fingers and arm means toward said trays when they move from said rest position.

* * * * *